United States Patent [19]

Moczygemba et al.

[11] Patent Number: 5,227,419
[45] Date of Patent: Jul. 13, 1993

[54] TAPERED BLOCK STYRENE/BUTADIENE COPOLYMERS

[75] Inventors: George A. Moczygemba; William J. Trepka, both of Bartlesville, Okla.

[73] Assignee: Phillips Petroleum Company, Bartlesville, Okla.

[21] Appl. No.: 632,239

[22] Filed: Dec. 20, 1990

[51] Int. Cl.$^5$ .................. C08F 293/00; C08F 297/04; C08K 5/52

[52] U.S. Cl. .................... 524/128; 524/349; 524/351; 525/250; 525/256; 525/258; 525/271; 525/314

[58] Field of Search ............... 525/250, 271, 314, 256, 525/258; 524/128, 349, 351

[56] References Cited

U.S. PATENT DOCUMENTS

| | | |
|---|---|---|
| 4,054,616 | 10/1977 | Miki et al. ............... 260/880 B |
| 4,080,407 | 3/1978 | Fodor ..................... 260/880 B |
| 4,167,545 | 9/1979 | Fahrbach et al. .......... 525/122 |
| 4,208,356 | 6/1980 | Fukawa et al. ............ 525/89 |
| 4,248,981 | 2/1981 | Milkovich et al. ......... 260/880 B |
| 4,335,221 | 6/1982 | Gerberding ............... 525/89 |
| 4,704,434 | 11/1987 | Kitchen et al. ............ 525/250 |
| 4,704,435 | 11/1987 | Kitchen .................... 525/250 |

*Primary Examiner*—Jacob Ziegler
*Attorney, Agent, or Firm*—Morrison Bennett

[57] ABSTRACT

A method for preparing tapered block copolymers in a polymerization process by charging an initiator and monomers sequentially with one or more charges of first one of the monomers, then with a mixture of the two monomers, and then with one or more charges of the first monomer to produce a polymodal tapered block copolymer. Suitable monomers include conjugated dienes and monovinylaromatic compounds. The copolymers are particularly useful for applications requiring environmental stress crack resistance.

44 Claims, No Drawings

TAPERED BLOCK STYRENE/BUTADIENE COPOLYMERS

BACKGROUND OF THE INVENTION

This invention relates to tapered block copolymers with vinylarene terminal blocks.

In another aspect, this invention relates to a method of preparing tapered block copolymers with vinylarene terminal blocks by charging of an organometal initiator and a vinyl-substituted aromatic compound with a sequence of more of the initiator and vinyl-substituted aromatic compound, optionally, a conjugated diene, a combination of the vinyl-substituted aromatic compound and a conjugated diene, and finally more of the vinyl-substituted aromatic compound.

Polymerization of styrene and butadiene with organolithium initiators to produce block copolymers in which one or more non-elastomeric polymer blocks are bonded to one or more elastomeric polymer blocks has been disclosed. Similarly, styrene and butadiene with terminal tapered blocks have been prepared by sequential charging of initiator and monomers to the polymerization zone to produce block copolymers suitable for manufacture of transparent colorless packages, wrap, and like articles. There is a continuing need for transparent colorless material with good environmental stress crack resistance properties for packaging and related industries, especially in the food and medical packaging industry where large varieties of products are employed. It is essential in food packaging that the articles employed do not allow leakage or contamination of the product. A particularly difficult problem is encountered when the plastic containers are used for food products having oily bases such as butter, lard, margarine, cooking oil, salad dressing and the like. The environmental stresses created by these oily bases often result in failure of the container.

SUMMARY OF THE INVENTION

Thus, it is an object of this invention to provide a novel tapered block copolymer of conjugated dienes and vinyl-substituted aromatic hydrocarbons with improved environmental stress crack resistance.

A further object of this invention is to provide a novel process for making tapered block copolymers.

The inventive copolymers are prepared by:

(a) charging a monovinylaromatic monomer, a randomizer and an initiator, and allowing essentially complete polymerization to occur; thereafter (b) charging additional monovinylaromatic monomer and initiator, and allowing essentially complete polymerization to occur; (c) optionally charging a conjugated diene monomer, and allowing essentially complete polymerization to occur; thereafter (d) charging a mixture of monovinylaromatic monomer and conjugated diene monomer, and allowing essentially complete polymerization to occur; thereafter (e) optionally charging additional monovinylaromatic monomer and allowing essentially complete polymerization to occur.

DETAILED DESCRIPTION OF THE INVENTION

The tapered block character of the polymer is produced by, after at least two initial charges of monovinylaromatic monomer and initiator, charging with a blend of monovinylaromatic monomer and conjugated diene. This is generally but not always followed by a charge of monovinylaromatic monomer. Optionally, after the initial charges of monovinylaromatic monomer and initiator, and before the reaction mixture is charged with the blend of monovinylaromatic monomer and conjugated diene, a charge of conjugated diene may be made. At each stage of charging, polymerization is allowed to continue until essentially no free monomer is present.

With each subsequent charge a different molecular weight species will be produced as well as the opportunity for polymerization of part of the charge with each of the existing species. After virtually complete polymerization of the final monomer charge, the active living linear block copolymers are charged with one or more terminating agents to form the desired polymodal tapered block copolymers.

Typical charging sequences with and without the optional charges and the major resulting polymer species at each stage, are shown in the following tables.

TABLE I

| Typical Charging Sequence (a), (b), (d)[a] | | |
|---|---|---|
| Stage | Charge | Polymer Species[b] |
| 1 | initiator$_1$, tetrahydrofuran and styrene$_1$ | S$_1$—Li$_1$ |
| 2 | initiator$_2$ and styrene$_2$ | S$_1$—S$_2$—Li$_1$ <br> S$_2$—Li$_2$ |
| 3 | butadiene$_1$ and styrene$_3$ | S$_1$—S$_2$—B$_1$/S$_3$—Li$_1$ <br> S$_2$—B$_1$/S$_3$—Li$_2$ |

[a] (a), (b), (d) correlate with steps in the summary of the invention.
[b] S = styrene
B/S = tapered block of butadiene and styrene.
The subscript numbers indicate the order in which that particular component was charged or formed.

TABLE II

| Typical Charging Sequence (a), (b), (d), (e)[a] | | |
|---|---|---|
| Stage | Charge | Polymer Species[b] |
| 1 | initiator$_1$, tetrahydrofuran and styrene$_1$ | S$_1$—Li$_1$ |
| 2 | initiator$_2$ and styrene$_2$ | S$_1$—S$_2$—Li$_1$ <br> S$_2$—Li$_2$ |
| 3 | butadiene$_1$ and styrene | S$_1$—S$_2$—B$_1$/S$_3$—Li$_1$ <br> S$_2$—B$_1$/S$_3$—Li$_2$ |
| 4 | styrene$_4$ | S$_1$—S$_2$—B$_1$/S$_3$—S$_4$—Li$_1$ <br> S$_2$—B$_1$/S$_3$—S$_4$—Li$_2$ |

[a] (a), (b), (d), (e) correlate with steps in the summary of the invention.
[b] S = Styrene
B/S = tapered block of butadiene and styrene.
The subscript numbers indicate the order in which that particular component was charged or formed.

TABLE III

| Typical Charging Sequence (a), (b), (d), (e)[a] | | |
|---|---|---|
| Stage | Charge | Polymer Species[b] |
| 1 | initiator$_1$, tetrahydrofuran and styrene$_1$ | S$_1$—Li$_1$ |
| 2 | initiator$_2$ and styrene$_2$ | S$_1$—S$_2$—Li$_1$ <br> S$_2$—Li$_2$ |
| 3 | butadiene$_1$ | S$_1$—S$_2$—B$_1$—Li$_1$ <br> S$_2$—B$_1$—Li$_2$ |
| 4 | butadiene$_2$ and styrene$_3$ | S$_1$—S$_2$—B$_1$—B$_2$/S$_3$—Li$_1$ <br> S$_2$—B$_1$—B$_2$/S$_3$—Li$_2$ |
| 5 | styrene$_4$ | S$_1$—S$_2$—B$_1$—B$_2$/S$_3$—S$_4$—Li$_1$ <br> S$_2$—B$_1$—B$_2$/S$_3$—S$_4$—Li$_2$ |

[a] (a), (b), (c), (d), (e) correlate with steps in the summary.
[b] S = styrene
B/S = tapered block of butadiene and styrene
The subscript numbers indicate the order in which that particular component was charged or formed.

At each stage, polymerization is allowed to continue until essentially no free monomer is present. The third step shown above in the Table I charging sequence, the third and fourth steps shown above in the Table II charging sequence, and the third, fourth and fifth steps shown above in the Table III charging sequence are carried out in the absence of additional initiator.

Tapered blocks in each of the growing polymer chains present are produced by simultaneously charging both monomers in either the third or fourth step in the charging sequence. As can be seen from the intermediate products listed in the typical charging sequence tables above, there are at least two distinct polymer species present. Thus, essentially bimodal block copolymers comprising high and low molecular weight species are produced. The randomizer causes random polymerization of the monovinylaromatic monomer and the conjugated diene, but the diene still enters into the chain faster than the monovinyl substituted aromatic so that the block tapers gradually from and essentially polybutadiene segment, to a random copolymer segment, to an essentially monovinyl substituted aromatic segment. It has been discovered that varying the amounts of randomizer causes dramatic changes in the environmental stress crack resistance of articles made from the block copolymers produced using the sequences of charges used in the processes of this invention.

The process of this invention can be carried out with any of the organomonoalkali metal compounds of the formula RM wherein R is an alkyl, cycloalkyl or arylcarbanion containing 4 to 8 carbon atoms and M is an alkyl metal cation. The presently preferred initiator is n-butyllithium.

Suitable amounts of initiator in the first charge containing initiator are in the range from about 0.008 to about 0.045 parts per hundred parts total monomer, more preferably in the range from about 0.01 to about 0.035 parts per hundred parts total monomer, and most preferably in the range from about 0.012 to about 0.025 parts per hundred parts total monomer. Suitable amounts of initiator in the second charge containing initiator are in the range from about 0.025 to about 0.15 parts per hundred parts total monomer, more preferably in the range from about 0.03 to about 0.10 parts per hundred parts total monomer, and most preferably in the range from about 0.035 to about 0.08 parts per hundred parts total monomer.

The conjugated diene monomers which can be used contain 4 to 6 carbon atoms and include 1,3-butadiene, 2-methyl-1,3-butadiene, 2-ethyl-1,3-butadiene, 2,3-dimethyl-1,3-butadiene and 1,3-pentadiene and mixtures thereof. Presently preferred is 1,3-butadiene.

The monovinylaromatic monomers which can be used contain 8 to 12 carbon atoms and include styrene, alpha-methylstyrene, 4-methylstyrene, 3-methylstyrene, 2-methylstyrene, 4-ethylstyrene, 3-ethylstyrene, 2-ethylstyrene, 4-tert-butylstyrene and 2,4-dimethylstyrene and mixtures thereof. Presently preferred is styrene.

The polymerization process is carried out in a hydrocarbon diluent at any suitable temperature in a range of $-10°$ to $150°$ C., preferably in the range of $0°$ to $120°$ C., at pressures sufficient to maintain the reaction mixture substantially in the liquid phase. Preferred hydrocarbon diluents include linear and cycloparaffins such as pentane, hexane, octane, cyclohexane, cyclopentane and mixtures thereof. Presently preferred is cyclohexane. Generally the temperature is such that the resulting polymer is in solution.

Small amounts of polar compounds are used in the hydrocarbon diluent to improve the effectiveness of alkylmonoalkali metal initiators such as n-butyllithium and to effect partial randomization of the vinylarene/conjugated diene so as to give a tapered block. Examples of polar compounds which can be advantageously employed are ethers, thioethers (sulfides) and tertiary amines. It is usually preferred to use ethers and sulfides in which the radicals attached to the oxygen or sulfur atoms are hydrocarbon radicals. Specific examples of such polar materials include dimethyl ether, diethyl ether, ethyl methyl ether, ethyl propyl ether, di-n-propyl ether, dibutyl ether, di-n-octyl ether, diethylglycoldimethylether, diethylglycol-diethylether, anisole, dioxane, 1,2-dimethoxyethane, dibenzyl ether, diphenyl ether, tetramethylene oxide (tetrahydrofuran), dimethyl sulfide, diethyl sulfide, di-n-propyl sulfide, di-n-butyl sulfide, methyl ethyl sulfide, dimethylethylamine, tri-n-ethylamine, tri-n-propylamine, tri-n-butylamine, trimethylamine, triethylamine, N,N-di-methylaniline, N-methyl-N-ethylaniline, N-methylmorpholine, and the like. It is to be understood also that mixtures of these polar compounds can be employed in the practice of the present invention. Presently preferred are either tetrahydrofuran or diethyl ether. Amounts of randomizer to provide from about 0.16 to 10 phm (parts per 100 parts of total monomer), preferably 0.25 to 1.0 phm are suitable.

The randomizer is added with the initial monovinylaromatic charge for the additional effect of causing the monovinylaromatic component resulting from each initiator charge to be of relatively narrow molecular weight distribution. Surprisingly, it has been found that superior results are obtained by having a bimodal molecular weight distribution of the total polymer chain lengths as a result of the addition of initiator at least two times and yet having the terminal monovinyl substituted aromatic component portions of the molecules resulting from each initiator addition be of relatively narrow molecular weight distribution.

The polymerization is carried out in a substantial absence of oxygen and water, preferably under an inert gas atmosphere. Prior to termination of the reaction the reaction mass contains a very high percentage of molecules in which an alkali metal cation is positioned at one end of each polymer chain. Impurities in the feed such as water or alcohol reduce the amounts of monoalkali metal polymer in the reaction mass.

It is presently preferred to carry this reaction out without a coupling step employing coupling agents.

At the conclusion of the polymerization process the system is treated with an active hydrogen compound such as water, alcohols, phenols or linear saturated aliphatic mono- and dicarboxylic acids to remove lithium from the polymer chains and to deactivate any residual initiator that might be present. The polymer cement, i.e., the solution of the polymer in the polymerization solvent, can be treated in several methods in a post polymerization treatment. In one method, the polymer cement is contacted with a solution of a hindered phenolic antioxidant, generally a hydrocarbon solution thereof, then with water and carbon dioxide and finally with one or more stabilizers, if desired. Another suitable method comprises treating the polymer cement first with water and carbon dioxide and then with a hydrocarbon solution containing one or more appropriate stabilizers. A presently preferred stabilizer combination consists of a hindered phenol such as octadecyl 3-(3',5'-di-t-butyl-4'-hydroxy-phenyl) propionate (Irganox® 1076, Ciba-Geigy product) or tetrakis [methylene(3,5-di-t-butyl-4-hydroxyhydrocinnamate)]methane (Irganox® 1010, Ciba-Geigy) and an organic phosphite, preferably tris(nonylphenyl)phosphite (TNPP).

Examples of other suitable stabilizers include: 2,6-di-t-butyl-4-methylphenol, 1,3,5-trimethyl-2,4,6-tris(3,5-di-t-butyl-4-hydroxybenzyl)benzene, tris(3,5-di-t-butyl-4-hydroxybenzyl)isocyanurate, tris(2,4-di-t-butylphenyl)-phosphite, tris(mixed mono- and dinonylphenyl)-phosphite, 2-t-butyl-α-(3-t-butyl-4-hydroxyphenyl)-p-cumenyl, bis(p-nonyl-phenyl)phosphite, 2-t-butyl-6(3-t-butyl-5-methyl-2-hydroxybenzyl)4-methylphenyl acrylate, N,N-di(hydrogenated tallow) hydroxylamine and pentaerythritol tetrakis-3-laurylthiopropionate.

A typical charging sequence and ranges of amounts of the charges are given in Table IV.

ene used in the copolymers were 85 to 15 and 75 to 25 as shown in Table IV. While not wishing to be bound by theory, applicants believe the copolymers following the termination step are comprised primarily of species having at least the following general formulas:

S-S-taper-S

S-taper-S wherein each S represents a polystyrene block and "taper" represents a random tapered block of polymerized styrene and butadiene.

Each polymerization run was carried out under nitrogen in a stirred, jacketed, stainless steel reactor of two-gallon capacity employing essentially anhydrous reactants and conditions. The block copolymers were prepared in a 4-step sequential charging process employing 2 n-butyllithium initiator charges, 3 styrene charges and

TABLE IV

| | | Typical Charging Sequence | | |
|---|---|---|---|---|
| Charge | Component | Broad Range | Preferred Range | Most Preferred Range |
| (a) | tetrahydrofuran | 0.16–10 phm$^a$ | 0.20–2.0 phm | 0.25–1.0 phm |
| | initiator | 0.008–0.045 phm | 0.01–0.035 phm | 0.012–0.025 phm |
| | | (0.125–0.70 mhm) | (0.16–0.55 mhm) | (0.19–0.39 mhm) |
| | monovinylaromatic monomer | 20–50 phm | 25–45 phm | 28–32 phm |
| (b) | initiator | 0.015–0.15 phm | 0.02–0.10 phm | 0.035–0.08 phm |
| | monovinylaromatic monomer | 5–25 phm | 8–20 phm | 10–15 phm |
| (c) | conjugated diene monomer | 0–15 phm | 3–14 phm | 5–14 phm |
| (d) | conjugated diene monomer | 10–40 phm | 15–35 phm | 20–30 phm |
| | monovinylaromatic monomer | 10–40 phm | 15–35 phm | 20–30 phm |
| (e) | monovinylaromatic monomer | 0–20 phm | 4–15 phm | 6–10 phm |

$^a$phm is parts per hundred parts total monomer.

The polymers prepared according to this invention are bimodal, resinous block copolymers and contain from about 60 to about 80, preferably from about 65 to about 80, and more preferably from about 70 to about 75, weight percent of polymerized monovinyl substituted aromatic hydrocarbon monomer based on the weight of total monomers employed.

The inventive copolymers contain from about 20 to about 40, preferably from about 20 to about 35, and more preferably from about 25 to about 30 weight percent conjugated diene monomer, based on the total weight of monomers incorporated into the copolymer.

The weight ratio of monovinyl substituted aromatic monomer to conjugated diene monomer in charge (d) is from about 1:0.9 to about 1:1.2, preferably from about 1:1 to about 1:1.1, and more preferably about 1:1.

Sufficient initiator is employed in both initiator charges to obtain a block copolymer having a melt flow ranging from about 2 to about 20 g/10 minutes as determined by ASTM D1238-73, condition G. Suitable amounts are described in Table IV.

The following examples will describe in more detail the experimental process used and the polymodal internal tapered block copolymers with vinylarene terminal blocks obtained as a result of the process.

EXAMPLE I

In each run there was prepared a resinous, linear bimodal block copolymer of styrene and 1,3-butadiene containing a polymerized internal tapered butadiene/styrene segment. The weight ratios of styrene to butadiene used in the copolymers were 85 to 15 and 75 to 25 as shown in Table IV.

1 charge of a styrene/1,3-butadiene mixture. The total monomer charge in each run was 1600 grams. The total cyclohexane charge including that used for flushing lines was about 3400 grams (212 phm, where phm represents parts by weight cyclohexane per 100 parts by weight monomers). The following general charge order was used:

1. Cyclohexane diluent and tetrahydrofuran
2. n-butyllithium, first portion, about 2 weight percent in cyclohexane solvent
3. Styrene, first portion
4. n-butyllithium, second portion in cyclohexane solvent
5. Styrene, second portion
6. Styrene/butadiene mixture
7. Styrene, third portion
8. Terminating agent
9. Antioxidant in cyclohexane solution Invention run 6 is detailed as an illustration of the actual procedure used.

In step 1, 170 phm cyclohexane; 0.3 phm tetrahydrofuran; 0.016 phm n-butyllithium; 30 phm styrene; and 14 phm cyclohexane diluent/flush were charged at about 43° C. to the reactor. The temperature peaked at about 72° C. as the styrene polymerized substantially adiabatically to completion in about 10 minutes. The reactor pressure was about 30 psig.

In the second step, a second charge of 0.052 phm n-butyllithium, 12 phm styrene and 11.3 phm cyclohexane diluent/flush was added to the reactor, which was then about 55° C. The polymerization was allowed to proceed substantially adiabatically to completion in about 12 minutes, the temperature peaking at about 62° C. The reactor pressure was 40 psig.

In the third step, a mixture of 25 phm each of styrene and butadiene and 5.7 phm cyclohexane flush were added to the reactor, which was then about 52° C. The polymerization was allowed to proceed substantially adiabatically to completion in about 16 minutes with the temperature peaking at about 113° C. The reactor pressure was 60 psig.

In step four, 8 phm styrene and 5.7 phm cyclohexane flush were charged to the reactor which was then about 96° C. The reaction proceeded substantially adiabatically to completion in about 10 minutes with the temperature peaking at 99° C. The reactor pressure was 70 psig.

After polymerization was complete the reaction was terminated by the addition of about 0.28 phm water and 180 psi carbon dioxide supplied from a 350 ml vessel equivalent to about 0.4 phm carbon dioxide and 5.7 phm cyclohexane flush. The reactor pressure was then 80 psig. After 20 minutes of reaction time and at a temperature of about 98° C., an antioxidant solution containing tris(nonylphenyl)phosphite (TNPP) and octadecyl 3-(3',5'-di-t-butyl-4-hydroxyphenyl) propionate (Irganox 1076®) was added to the reactor charge. Sufficient solution was added to provide 1 phm TNPP and 0.25 phm Irganox 1076® while stirring continued. The reactor pressure was 125 psig.

The polymer cement was transferred to a 5-gallon capacity reactor where it was mixed with 0.25 phm microcrystalline wax (Be Square® 195) as an antiblocking agent. Be Square 195 wax is marketed by Bareco, a Division of Petrolite Corporation, Tulsa, Okla.

The mixture was finally heated to about 178° C. and flashed to removed a portion of the cyclohexane. Polymer isolated from this operation containing about 15–20 weight percent residual solvent can be dried further in a vacuum oven at about 100° C. or passed through a devolatilizing extruder or the like to remove substantially all of the remaining solvent.

Following this general procedure a series of block copolymers employing various tetrahydrofuran levels and several styrene/butadiene weight ratios. The copolymers made and selected physical properties determined for them are given in Table V.

The test specimens for the determination of physical properties other than environmental stress crack resistance (ESCR) were prepared by injection molding in an Arburg 221E/150, 1½ ounce machine at a barrel temperature of about 210° C., a mold temperature of about 25° C., a screw speed setting of about 360, an injection pressure adjusted to fill the mold, generally ranging from about 60–70 KP/cm$^2$ and a total cycle time of 45 seconds.

Test specimens for ESCR were cut from extruded sheet. The sheet was prepared by extruding the melt at a temperature of about 175°–185° C. through a sheeting die and around a cooled polishing roll. The finished sheet, about 13 to about 20 mils in thickness, was then wound onto a 2½–3 inch diameter tube and secured.

The results in Table V show in control runs 1 and 2 that a styrene/butadiene weight ratio of 85/15 does not provide adequate ESCR even when the tetrahydrofuran (THF) level is the usually desired amount of about 0.3 phm. The copolymers are also harder and less impact resistant, as expected, than the other polymers in this series having a 70/30 styrene/butadiene weight ratio. See Table VII.

The effect of the THF level on the ESCR, hardness and flexural modulus properties of the copolymers is shown in the remaining runs. Control runs 3 and 4 show that THF levels of 0.1 phm and 0.15 phm, respectively, are not adequate to obtain desirable ESCR results. Invention run 5, with a THF level of 0.25 phm, gives a polymer that has an ESCR of 102 minutes in the puncture test compared to the 17 and 23 minutes obtained in runs 3 and 4. When the THF level is increased to 0.3 phm, the ESCR results are substantially better, as shown by the value of 142 minutes shown in invention run 6 and the value of 105 minutes shown in invention run 7.

TABLE V

Effect of THF Level on Physical Properties of Linear Tapered Block Copolymers

| Run No. | THF$^a$ phm$^b$ | Melt Flow g/10 min$^c$ | Hardness Shore D$^d$ | Flexural Modulus MPa$^e$ | Tensile Break MPa$^f$ | Elongation Break, %$^g$ | Izod Impact Notched, J/M$^h$ | ESCR, minutes$^i$ | Weight Ratio S/B | Remarks |
|---|---|---|---|---|---|---|---|---|---|---|
| 1 | 0.04 | 4.6 | 79 | 1652 | 28.2 | 25.5 | 16.8 | 0.5 | 85/15 | control |
| 2 | 0.3 | 5.0 | 78 | 1551 | 29.2 | 230 | 27.6 | 0.6 | 85/15 | control |
| 3 | 0.1 | 4.5 | 66 | 1271 | 30.8 | 283 | 722 | 17. | 75/25 | control |
| 4 | 0.15 | 5.4 | 65 | 1135 | 30.4 | 286 | 711 | 23. | 75/25 | control |
| 5 | 0.25 | 6.1 | 66 | 1011 | 29.7 | 278 | 665 | 102. | 75/25 | invention |
| 6 | 0.3 | 7.4 | 62 | 875 | 29.8 | 283 | 690 | 142. | 75/25 | invention |
| 7 | 0.3 | 5.4 | 62 | 735 | 28.6 | 290 | 762 | 105. | 75/25 | invention |

$^a$THF is tetrahydrofuran.
$^b$phm is parts by weight THF per 100 parts by weight monomers.
$^c$ASTM D1238, condition G.
$^d$ASTM D2240.
$^e$ASTM D790.
$^f$ASTM D638, 0.2 inches/minute.
$^g$ASTM D638, 0.2 inches/minute.
$^h$ASTM D252.
$^i$The values represent the minutes to failure in the puncture test described in Example III above, using soybean oil.

EXAMPLE II

Several resinous, linear, bimodal block copolymers of styrene and 1,3-butadiene, having a 70/30 weight ratio, and which contain an internal tapered styrene/butadiene segment and a polybutadiene segment were prepared in a five-step process. Two n-butyllithium charges were employed as recited in Example I. The copolymers, following termination, were believed to comprise primarily species having at least the following general formulas:

S-S-B-taper-S

S-B-taper-S wherein S represents a polystyrene block, B represents a polybutadiene block, and "taper" represents a random tapered block of polymerized styrene and butadiene.

Each polymerization was carried out as described in Example I except that butadiene was separately charged and polymerized after the polymerization of the second styrene charge and before polymerization of the styrene/butadiene portion. In control run 1, a THF level of 0.04 phm was used and in invention run 2, 0.3 phm THF was present. The procedure actually employed in invention run 2 is given as an illustration.

In step 1, 170 phm cyclohexane; 0.3 phm THF; 0.016 phm NBL; 30 phm styrene; and 14 phm diluent/flush cyclohexane were charged at about 40° C. to the reactor. The temperature peaked at about 71° C. as the styrene polymerized substantially adiabatically to completion in about 12 minutes. The reactor pressure was 30 psig.

In step 2, a second charge of 0.058 phm NBL, 12 phm styrene and 11.3 phm diluent/flush cyclohexane was added to the reactor which was then about 55° C. Polymerization proceeded substantially adiabatically to completion in about 13 minutes with the temperature peaking at about 65° C. The reactor pressure was 40 psig.

In step 3, 12.5 phm butadiene and 5.7 phm cyclohexane flush were charged to the reactor which was then about 50° C. The step 3 charge polymerized substantially adiabatically to completion in about 16 minutes with the temperature peaking at about 68° C. The reactor pressure was about 40 psig.

In step 4, 17.5 phm styrene, 17.5 phm butadiene and 5.7 phm cyclohexane flush were added to the reactor which was then about 66° C. Polymerization proceeded substantially adiabatically to completion in about 13 minutes with the temperature peaking at about 109° C. The reactor pressure was 60 psig.

In step 5, 10.5 phm styrene and 5.7 phm cyclohexane flush were charged to the reactor which was then 94° C. Polymerization was allowed to proceed adiabatically to substantial completion in about 15 minutes with the temperature peaking at about 101° C. The reactor pressure was 70 psig.

After polymerization was complete, the reaction was terminated, antioxidant solution added, wax added and the polymer recovered exactly in the manner described in Example I.

The copolymer prepared in control run 1 was prepared as in invention run 2 except that a THF level of 0.04 phm was used.

Selected physical properties of each copolymer were determined in the same manner as those obtained for the polymers prepared in Example I. The results are presented in Table VI.

The effects on the resulting polymers obtained of increasing the THF level of 0.04 phm in control run 1 to 0.3 phm THF in invention run 2 parallels the effects shown in Example I. That is, the ESCR is boosted more than tenfold while some decline in hardness and flexural modulus values is shown.

TABLE VI

Physical Properties of Linear Tapered 70/30 Styrene/Butadiene Copolymers

| Run No. | THF$^a$ phm$^b$ | Melt Flow g/10 min$^c$ | Hardness Shore D$^d$ | Flexural Modulus MPa$^e$ | Tensile Break, MPa$^f$ | Elongation Break, Percent$^g$ | Izod Impact Notched, J/M$^h$ | ESCR, minutes$^i$ | Remarks |
|---|---|---|---|---|---|---|---|---|---|
| 1 | 0.04 | 5.1 | 62 | 1124 | 32.2 | 293 | 681 | 16 | control |
| 2 | 0.3 | 5.5 | 58 | 799.8 | 28.6 | 287 | 585 | 186 | invention |

$^a$THF is tetrahydrofuran.
$^b$phm is parts by weight THF per 100 parts by weight monomers.
$^c$ASTM D1238, condition G.
$^d$ASTM D2240.
$^e$ASTM D790.
$^f$ASTM D638, 0.2 inches/minute.
$^g$ASTM D638, 0.2 inches/minute.
$^h$ASTM D252.
$^i$The values represent the minutes to failure in the puncture test described in Example III above, using soybean oil.

EXAMPLE III

A portion of each of the polymers produced in runs 3, 4, 5, 6 and 7 shown in Table V was tumbled with 40 weight percent general purpose (crystal) polystyrene, such as, for example, Styron 555, a product of The Dow Chemical Company, Midland, Mich. The resulting blends consisting of 60 weight percent block copolymer and 40 weight percent crystal polystyrene were extruded and formed into sheets about 13 to 20 mils thick as before and then wound onto 2½-3 inch tubes and secured. Specimens were cut from each roll and tested for environmental stress crack resistance by means of a test developed for that purpose. The test is based upon the breaking of a small square of a 15 mil plastic sheet with a weighted stainless steel rod with a rounded tip. The samples were cut into two-inch squares and the thickness of each was measured. Each sample was then placed over a hole in a test bed and clamped down with a rubber ring and weight. Four drops of the test solution (soybean oil) were placed on the sample directly over the hole. The weighted stainless rod with a rounded tip was placed on the sample and a timer was triggered. All samples were measured ten times and the results were reported with statistical relevance. All samples were compared to a control run under the same test conditions.

For the control sample the break time for the puncture test (curlup) was 3.89 minutes, with a 95% confidence limit of 0.18 minute.

A portion of each of the polymers produced in runs 1 and 2, shown in Table VI, was mixed with 50 weight percent of the crystal polystyrene, extruded to form sheet and wound onto tubes in the manner previously described. Specimens for ESCR testing were cut from each roll.

The amount of THF employed in each polymerization run, a brief indication of polymer structure for the high molecular weight fraction of the total polymer, the quantity of monomers charged and the ESCR results obtained are presented in Table VII.

The ESCR results in runs 1 through 5 with the 75/25 styrene/butadiene block copolymers and in runs 6 and 7 with the 70/30 styrene/butadiene block copolymers follow the same trend shown in Tables V and VI for the copolymers alone. That is, as the THF level employed in polymerization is increased, the ESCR value also increases. The best results are apparent at the 0.3 phm THF level.

The styrene/butadiene weight ratio in all the blends was 85/15. However, runs 6 and 7 employed 50 weight percent polystyrene in the blends. Runs 1 through 5 were made with 40 weight percent polystyrene. The results suggest that when the crystal polystyrene content comprises about 50 weight percent or more of the blend, the effect of using more THF during polymerization of the block copolymer is largely negated.

TABLE VII

Block Copolymer/Polystyrene Blends

| Run No. | Block Copolymer Structure Monomer Charged, phm[a] | Styrene/ Butadiene Weight Ratio Copolymer | Blend | THF[b] phm[c] | ESCR,[d] minutes[e] |
|---|---|---|---|---|---|
| 1 | S, S, B/S, S (30, 12, 25/25, 8) | 75/25 | 85/15 | 0.1 | 1.9 |
| 2 | S, S, B/S, S (30, 12, 25/25, 8) | 75/25 | 85/15 | 0.15 | 2.7 |
| 3 | S, S, B/S, S (30, 12, 25/25, 8) | 75/25 | 85/15 | 0.25 | 4.0 |
| 4 | S, S, B/S, S (30, 12, 25/25, 8) | 75/25 | 85/15 | 0.3 | 6.6 |
| 5 | S, S, B/S, S (30, 12, 25/25, 8) | 75/25 | 85/15 | 0.3 | 8.3 |
| 6 | S, S, B, B/S, S (30, 12, 12.5, 17.5/17.5, 10.5) | 70/30 | 85/15 | 0.04 | 1.5 |
| 7 | S, S, B, B/S, S (30, 12, 12.5, 17.5/17.5, 10.5) | 70/30 | 85/15 | 0.3 | 1.8 |

[a]phm is parts by weight per 100 parts total monomer.
[b]THF is tetrahydrofuran.
[c]phm is parts by weight THF per 100 parts by weight monomers.
[d]ESCR is environmental stress crack resistance.
[e]The values represent minutes until failure in the puncture test described in Example III above, using soybean oil.

While the polymers and methods of this invention have been described in detail for the purpose of illustration, the inventive polymers and methods are not to be construed as limited thereby. This patent is intended to cover all changes and modifications within the spirit and scope thereof.

That which is claimed is:

1. A method of preparing a polymer comprising:
   (a) charging a monovinylaromatic monomer, a randomizer and an initiator, and allowing polymerization to occur until essentially no free monomer is present; thereafter
   (b) charging additional monovinylaromatic monomer and initiator, and allowing polymerization to occur until essentially no free monomer is present; and
   (c) charging a mixture of monovinylaromatic monomer and conjugated diene monomer, and allowing polymerization to occur until essentially no free monomer is present;
   wherein said monomer charges in (a), (b) and (c) represent the only monomer additions during the course of said method; and
   wherein said initiator charges in (a) and (b) represent the only initiator additions during the course of said method.

2. A method according to claim 1 wherein said monovinylaromatic monomer contains 8 to 12 carbon atoms and said conjugated diene contains 4 to 6 carbon atoms, said monomers being introduced at a ratio of about 60 to 80 weight percent monovinylaromatic monomer and 20 to 40 weight percent conjugated diene monomer, thus giving a resinous block copolymer.

3. A method according to claim 1 wherein said randomizer in Step (a) is present in an amount in the range from about 0.16 to about 10 parts per hundred parts total monomer.

4. A method according to claim 1 wherein the weight ratio of the amounts of said monovinylaromatic monomer and said conjugated diene monomer in Step (c) is within the range of about 1:0.9 to 1:1.2.

5. A method according to claim 1
   wherein said monovinylaromatic monomer charged in Step (a) is from about 20 to about 50 parts per hundred parts total monomer charged in said method;
   wherein said monovinylaromatic monomer charged in Step (b) is from about 5 to about 25 parts per hundred parts total monomer charged in said method;
   wherein said monovinylaromatic monomer charged in Step (c) is from about 10 to about 40 parts per hundred parts total monomer charged in said method; and
   wherein said conjugated diene monomer charged in Step (c) is from about 10 to about 40 parts per hundred parts total monomer charged in said method.

6. A method according to claim 1
   wherein said monovinylaromatic monomer charged in Step (a) is from about 25 to about 45 parts per hundred parts total monomer charged in said method;
   wherein said monovinylaromatic monomer charged in Step (b) is from about 8 to about 20 parts per hundred parts total monomer charged in said method;
   wherein said monovinylaromatic monomer charged in Step (c) is from about 15 to about 35 parts per hundred parts total monomer charged in said method; and
   wherein said conjugated diene monomer charged in Step (c) is from about 15 to about 35 parts per hundred parts total monomer charged in said method.

7. A method according to claim 1
   wherein said monovinylaromatic monomer charged in Step (a) is from about 28 to about 32 parts per hundred parts total monomer charged in said method;
   wherein said monovinylaromatic monomer charged in Step (b) is from about 10 to about 15 parts per hundred parts total monomer charged in said method;
   wherein said monovinylaromatic monomer charged in Step (c) is from about 20 to about 30 parts per hundred parts total monomer charged in said method; and
   wherein said conjugated diene monomer charged in Step (c) is from about 20 to about 30 parts per hundred parts total monomer charged in said method.

8. A method according to claim 1 wherein said conjugated diene monomer is 1,3-butadiene, said monovinylaromatic monomer is styrene, said organomonoalkali metal initiator is n-butyllithium, and said randomizer is tetrahydrofuran.

9. A method according to claim 8
wherein said polymerization is carried out in a hydrocarbon diluent;
wherein said polymerization is carried out in a substantial absence of oxygen and water at temperatures ranging from $-10°$ C. to $150°$ C.;
wherein, after said polymerization is substantially complete, the system is treated with a terminating agent and then a stabilizer; and
wherein, after termination with said terminating agents, a portion of remaining hydrocarbon diluent is flashed off.

10. A method according to claim 9
wherein said terminating agent is water and carbon dioxide; and
wherein said stabilizer is chosen from the group of hindered phenols and organophosphites.

11. Polymodal copolymers produced in accordance with the method of claim 1.

12. A method of preparing a polymer comprising:
(a) charging a monovinylaromatic monomer, a randomizer and an initiator, and allowing polymerization to occur until essentially no free monomer is present; thereafter
(b) charging additional monovinylaromatic monomer and initiator, and allowing polymerization to occur until essentially no free monomer is present;
(c) charging a mixture of monovinylaromatic monomer and conjugated diene monomer, and allowing polymerization to occur until essentially no free monomer is present; and
(d) charging additional monovinylaromatic monomer and allowing polymerization to occur until essentially no free monomer is present;
wherein said monomer charges in (a), (b), (c) and (d) represent the only monomer additions during the course of said method; and
wherein said initiator charges in (a) and (b) represent the only initiator additions during the course of said method.

13. A method according to claim 12 wherein said monovinylaromatic monomer contains 8 to 12 carbon atoms and said conjugated diene contains 4 to 6 carbon atoms, said monomers being introduced at a ratio of about 60 to 80 weight percent monovinylaromatic monomer and 20 to 40 weight percent conjugated diene monomer, thus giving a resinous block copolymer.

14. A method according to claim 12 wherein the weight ratio of the amounts of said monovinylaromatic monomer and said conjugated diene monomer in Step (c) is within the range of about 1:0.9 to 1:1.2.

15. A method according to claim 12 wherein said randomizer in Step (a) is present in an amount in the range from about 0.16 to about 10 parts per hundred parts total monomer.

16. A method according to claim 12
wherein said monovinylaromatic monomer charged in Step (a) is from about 20 to about 50 parts per hundred parts total monomer charged in said method;
wherein said monovinylaromatic monomer charged in Step (b) is from about 5 to about 25 parts per hundred parts total monomer charged in said method;
wherein said monovinylaromatic monomer charged in Step (c) is from about 10 to about 40 parts per hundred parts total monomer charged in said method;
wherein said conjugated diene monomer charged in Step (c) is from about 10 to about 40 parts per hundred parts total monomer charged in said method; and
wherein said additional monovinylaromatic monomer charged in Step (d) is from greater than 0 to about 20 parts per hundred parts total monomer.

17. A method according to claim 12
wherein said monovinylaromatic monomer charged in Step (a) is from about 25 to about 45 parts per hundred parts total monomer charged in said method;
wherein said monovinylaromatic monomer charged in Step (b) is from about 8 to about 20 parts per hundred parts total monomer charged in said method;
wherein said monovinylaromatic monomer charged in Step (c) is from about 15 to about 35 parts per hundred parts total monomer charged in said method;
wherein said conjugated diene monomer charged in Step (c) is from about 15 to about 35 parts per hundred parts total monomer charged in said method; and
wherein said additional monovinylaromatic monomer charged in Step (d) is from about 4 to about 15 parts per hundred parts total monomer.

18. A method according to claim 12
wherein said monovinylaromatic monomer charged in Step (a) is from about 28 to about 32 parts per hundred parts total monomer charged in said method;
wherein said monovinylaromatic monomer charged in Step (b) is from about 10 to about 15 parts per hundred parts total monomer charged in said method;
wherein said monovinylaromatic monomer charged in Step (c) is from about 20 to about 30 parts per hundred parts total monomer charged in said method;
wherein said conjugated diene monomer charged in Step (c) is from about 20 to about 30 parts per hundred parts total monomer charged in said method; and
wherein said additional monovinylaromatic monomer charged in Step (d) is from about 6 to about 10 parts per hundred parts total monomer.

19. A method according to claim 12 wherein said conjugated diene monomer is 1,3-butadiene, said monovinylaromatic monomer is styrene, said organomonoalkali metal initiator is n-butyllithium, and said randomizer is tetrahydrofuran.

20. A method according to claim 19
wherein said polymerization is carried out in a hydrocarbon diluent;
wherein said polymerization is carried out in a substantial absence of oxygen and water at temperatures ranging from $-10°$ C. to $150°$ C.;
wherein, after said polymerization is substantially complete, the system is treated with a terminating agent and then a stabilizer; and
wherein, after termination with said terminating agents, a portion of remaining hydrocarbon diluent is flashed off.

21. A method according to claim 20
wherein said terminating agent is water and carbon dioxide; and wherein said stabilizer is chosen from the group of hindered phenols and organophosphites.

22. Polymodal copolymers produced in accordance with the method of claim 12.

23. A method of preparing a polymer comprising:
   (a) charging a monovinylaromatic monomer, a randomizer and an initiator, and allowing polymerization to occur until essentially no free monomer is present; thereafter
   (b) charging additional monovinylaromatic monomer and initiator, and allowing polymerization to occur until essentially no free monomer is present;
   (c) charging a conjugated diene monomer and allowing polymerization to occur until essentially no free monomer is present;
   (d) charging a mixture of monovinylaromatic monomer and conjugated diene monomer, and allowing polymerization to occur until essentially no free monomer is present; and
   (e) charging additional monovinylaromatic monomer and allowing polymerization to occur until essentially no free monomer is present;
   wherein said monomer charges in (a), (b), (c), (d) and (e) represent the only monomer additions during the course of said method; and
   wherein said initiator charges in (a) and (b) represent the only initiator additions during the course of said method.

24. A method according to claim 23 wherein said monovinylaromatic monomer contains 8 to 12 carbon atoms and said conjugated diene contains 4 to 6 carbon atoms, said monomers being introduced at a ratio of about 60 to 80 weight percent monovinylaromatic monomer and 20 to 40 weight percent conjugated diene monomer, thus giving a resinous block copolymer.

25. A method according to claim 23 wherein the weight ratio of the amounts of said monovinylaromatic monomer and said conjugated diene monomer in Step (d) is within the range of about 1:0.9 to 1:1.2.

26. A method according to claim 23 wherein said randomizer in Step (a) is present in an amount in the range from about 0.16 to about 10 parts per hundred parts total monomer.

27. A method according to claim 23
   wherein said monovinylaromatic monomer charged in Step (a) is from about 20 to about 50 parts per hundred parts total monomer charged in said method;
   wherein said monovinylaromatic monomer charged in Step (b) is from about 5 to about 25 parts per hundred parts total monomer charged in said method;
   wherein said conjugated diene monomer charged in Step (c) is from greater than 0 to about 15 parts per hundred parts total monomer charged in said method;
   wherein said monovinylaromatic monomer charged in Step (d) is from about 10 to about 40 parts per hundred parts total monomer charged in said method;
   wherein said conjugated diene monomer charged in Step (d) is from about 10 to about 40 parts per hundred parts total monomer charged in said method; and
   wherein said additional monovinylaromatic monomer charged in Step (e) is from greater than 0 to about 20 parts per hundred parts total monomer.

28. A method according to claim 23
   wherein said monovinylaromatic monomer charged in Step (a) is from about 25 to about 45 parts per hundred parts total monomer charged in said method;
   wherein said monovinylaromatic monomer charged in Step (b) is from about 8 to about 20 parts per hundred parts total monomer charged in said method;
   wherein said conjugated diene monomer charged in Step (c) is from about 3 to about 14 parts per hundred parts total monomer charged in said method;
   wherein said monovinylaromatic monomer charged in Step (d) is from about 15 to about 35 parts per hundred parts total monomer charged in said method;
   wherein said conjugated diene monomer charged in Step (d) is from about 15 to about 35 parts per hundred parts total monomer charged in said method; and
   wherein said additional monovinylaromatic monomer charged in Step (e) is from about 4 to about 15 parts per hundred parts total monomer.

29. A method according to claim 23
   wherein said monovinylaromatic monomer charged in Step (a) is from about 28 to about 32 parts per hundred parts total monomer charged in said method;
   wherein said monovinylaromatic monomer charged in Step (b) is from about 10 to about 15 parts per hundred parts total monomer charged in said method;
   wherein said conjugated diene monomer charged in Step (c) is from about 5 to about 14 parts per hundred parts total monomer charged in said method;
   wherein said monovinylaromatic monomer charged in Step (d) is from about 20 to about 30 parts per hundred parts total monomer charged in said method;
   wherein said conjugated diene monomer charged in Step (d) is from about 20 to about 30 parts per hundred parts total monomer charged in said method; and
   wherein said additional monovinylaromatic monomer charged in Step (e) is from about 6 to about 10 parts per hundred parts total monomer.

30. A method according to claim 23 wherein said conjugated diene monomer is 1,3-butadiene, said monovinylaromatic monomer is styrene, said organomonoalkali metal initiator is n-butyllithium, and said randomizer is tetrahydrofuran.

31. A method according to claim 30
   wherein said polymerization is carried out in a hydrocarbon diluent;
   wherein said polymerization is carried out in a substantial absence of oxygen and water at temperatures ranging from −10° C. to 150° C.;
   wherein, after said polymerization is substantially complete, the system is treated with a terminating agent and then a stabilizer; and
   wherein, after termination with said terminating agents, a portion of remaining hydrocarbon diluent is flashed off.

32. A method according to claim 31
   wherein said terminating agent is water and carbon dioxide; and
   wherein said stabilizer is chosen from the group of hindered phenols and organophosphites.

33. Polymodal copolymers produced in accordance with the method of claim 23.

34. A method of preparing a polymer comprising:
(a) charging a monovinylaromatic monomer, a randomizer and an initiator, and allowing polymerization to occur until essentially no free monomer is present; thereafter
(b) charging additional monovinylaromatic monomer and initiator, and allowing polymerization to occur until essentially no free monomer is present;
(c) charging conjugated diene monomer and allowing polymerization to occur until essentially no free monomer is present; and
(d) charging a mixture of monovinylaromatic monomer and conjugated diene monomer, and allowing polymerization to occur until essentially no free monomer is present;
wherein said monomer charges in (a), (b), (c) and (d) represent the only monomer additions during the course of said method.

35. A method according to claim 34 wherein said monovinylaromatic monomer contains 8 to 12 carbon atoms and said conjugated diene contains 4 to 6 carbon atoms, said monomers being introduced at a ratio of about 60 to 80 weight percent monovinylaromatic monomer and 20 to 40 weight percent conjugated diene monomer, thus giving a resinous block copolymer.

36. A method according to claim 34 wherein the weight ratio of the amounts of said monovinylaromatic monomer and said conjugated diene monomer in Step (c) is within the range of about 1:0.9 to 1:1.2.

37. A method according to claim 34 wherein said randomizer in Step (a) is present in an amount in the range from about 0.16 to about 10 parts per hundred parts total monomer.

38. A method according to claim 34
wherein said monovinylaromatic monomer charged in Step (a) is from about 20 to about 50 parts per hundred parts total monomer charged in said method;
wherein said monovinylaromatic monomer charged in Step (b) is from about 5 to about 25 parts per hundred parts total monomer charged in said method;
wherein said additional conjugated diene monomer charged in Step (c) is from greater than 0 to about 15 parts per hundred parts total monomer;
wherein said monovinylaromatic monomer charged in Step (d) is from about 10 to about 40 parts per hundred parts total monomer charged in said method; and
wherein said conjugated diene monomer charged in Step (d) is from about 10 to about 40 parts per hundred parts total monomer charged in said method.

39. A method according to claim 34
wherein said monovinylaromatic monomer charged in Step (a) is from about 25 to about 45 parts per hundred parts total monomer charged in said method;
wherein said monovinylaromatic monomer charged in Step (b) is from about 8 to about 20 parts per hundred parts total monomer charged in said method;
wherein said additional conjugated diene monomer charged in Step (c) is from about 3 to about 14 parts per hundred parts total monomer;
wherein said monovinylaromatic monomer charged in Step (c) is from about 15 to about 35 parts per hundred parts total monomer charged in said method; and
wherein said conjugated diene monomer charged in Step (c) is from about 15 to about 35 parts per hundred parts total monomer charged in said method.

40. A method according to claim 34
wherein said monovinylaromatic monomer charged in Step (a) is from about 28 to about 32 parts per hundred parts total monomer charged in said method;
wherein said monovinylaromatic monomer charged in Step (b) is from about 10 to about 15 parts per hundred parts total monomer charged in said method;
wherein said additional conjugated diene monomer charged in Step (c) is from about 5 to about 14 parts per hundred parts total monomer;
wherein said monovinylaromatic monomer charged in Step (d) is from about 20 to about 30 parts per hundred parts total monomer charged in said method; and
wherein said conjugated diene monomer charged in Step (d) is from about 20 to about 30 parts per hundred parts total monomer charged in said method.

41. A method according to claim 34 wherein said conjugated diene monomer is 1,3-butadiene, said monovinylaromatic monomer is styrene, said organomonoalkali metal initiator is n-butyllithium, and said randomizer is tetrahydrofuran.

42. A method according to claim 41
wherein said polymerization is carried out in a hydrocarbon diluent;
wherein said polymerization is carried out in a substantial absence of oxygen and water at temperatures ranging from −10° C. to 150° C.;
wherein, after said polymerization is substantially complete, the system is treated with a terminating agent and then a stabilizer; and
wherein, after termination with said terminating agents, a portion of remaining hydrocarbon diluent is flashed off.

43. A method according to claim 42
wherein said terminating agent is water and carbon dioxide; and
wherein said stabilizer is chosen from the group of hindered phenols and organophosphites.

44. Polymodal copolymers produced in accordance with the method of claim 34.

* * * * *